United States Patent Office 3,294,730
Patented Dec. 27, 1966

3,294,730
PROCESS FOR THE PRODUCTION OF FIRE-RESISTANT METHACRYLATE RESIN COMPOSITIONS CONTAINING PHOSPHATES
Alan William Jukes, St. Albans, England, assignor to Imperial Chemical Industries Limited, London, England, a corporation of Great Britain
No Drawing. Filed July 15, 1963, Ser. No. 295,211
Claims priority, application Great Britain, July 23, 1962, 28,196/62; Jan. 8, 1963, 873/63
8 Claims. (Cl. 260—30.6)

The present invention relates to improvements in synthetic resin compositions and in particular to improvements in polymethyl methacrylate compositions.

By polymethyl methacrylate compositions we include polymers of methyl methacrylate and copolymers of methyl methacrylate containing minor proportions of other comonomers.

Such polymethyl methacrylate compositions in general have the disadvantage that they may support combustion. It is an object of the present invention to provide a process for the production of such compositions having reduced inflammability.

According to the present invention we provide a process which comprises polymerizing methyl methacrylate in bulk or in solution alone or as a mixture with a minor proportion of other copolymerizable monomers, in monomeric or partially polymerized form, to which has been added phosphorus pentoxide and at least one alcohol selected from the class consisting of aliphatic alcohols, cycloaliphatic alcohols and aralkyl alcohols containing from 1 to 8 carbon atoms per molecule there being from 1.5 to 5 moles of alcohol or mixture of alcohols to each mole of phosphorus pentoxide, with if desired a subsequent addition of methyl methacrylate alone or as said mixture, in monomeric or partially polymerized form, and initiating polymerization of the polymerizable ingredients during or after reaction of the phosphorus pentoxide and said alcohol or alcohols, the amount of said phosphorus pentoxide and said alcohol or alcohols initially added forming from 3 to 20% by weight of the total weight of polymerizable ingredients in the material undergoing polymerization together with any polymer present plus the weight of said initially added phosphorus pentoxide and said alcohol or alcohols.

Other monomers that may be copolymerized with methyl methacrylate include, for example, acrylic acid, methacrylic acid, the esters of acrylic and methacrylic acid particularly the lower alkyl esters containing from 1 to 12 carbon atoms in the alkyl part of the molecule, styrene, e.g. the halogen substituted styrenes, and acrylonitrile. Normally where such compounds are added to make some small modification of the properties of the polymethyl methacrylate, relatively small amounts are added. For these purposes from 1 to 15% by weight of such added monomers based on the total weight of monomer plus polymer (if any) gives useful results. Higher proportions can be used if desired.

The alcohols that may be used in the present invention may be substituted with elements that are known to donate fire retardant properties e.g. the halogens, and phosphorus. They may also be ethylenically unsaturated. Examples of the alcohols that may be used include chloroethyl, isopropyl, n-propyl, butyl, 2-ethyl hexyl, benzyl, cyclohexyl and allyl alcohols. In general primary alcohols give slightly better results than secondary or tertiary alcohols.

The phosphorus pentoxide reacts with the alcohol or mixture of alcohols to give acid phosphates. These phosphates are the main fire retarding components of the composition and they may also act as plasticizers. In order that the softening point should not be reduced too much, it is often desirable to include an alcohol in the composition that is ethylenically unsaturated so that it may copolymerize with the methyl methacrylate, e.g. allyl alcohol or 2-hydroxy-ethyl methacrylate.

We prefer that the minimum amount of the mixture of phosphorus pentoxide and alcohol or alcohols that should be included in the composition should be 5% by weight in order to give significant beneficial fire retardant properties. Where the amount used is from 3% to 5% useful effects may be obtained, but in these circumstances we prefer that these lower concentrations of phosphorus pentoxide and alcohol or alcohols should be used in combination with other added fire retardant materials. If more than 20% by weight of the mixture of phosphorus pentoxide and alcohol or alcohols is used then the softening point drops excessively and there is an increased tendency to absorb moisture and therefore the preferred proportions of the mixture of phosphorus pentoxide and alcohol or alcohols are from 9 to 18% by weight of the total weight of phosphorus pentoxide and alcohol or alcohols plus the weight of monomer and polymer (if this is also present as when syrups are used).

It may be convenient to add the phosphorus pentoxide and the alcohol or alcohols in concentrations greater than 20% (e.g. up to 50% or greater) of the methyl methacrylate and other ingredients as hereinbefore defined, and then to dilute this concentrated mixture before use with further methyl methacrylate with or without minor amounts of other monomers to reduce the concentration of initially added phosphorus pentoxide and alcohol or alcohols so as not to exceed 20%. This enables smaller volumes of monomer or syrup to be handled during the addition of the phosphorus pentoxide and alcohol which may be a more convenient method where this step in the process has to be carried out in a separate location from that in which the polymerization is carried out. When this is done it may also be desired to add a known polymerization inhibitor (e.g. hydroquinone) to maintain the stability of the monomer.

Our process requires the presence of from 1.5 to 5 moles of alcohol or mixture of alcohols to each mole of phosphorus pentoxide as this gives the most useful range of proportions of the mono and dihydrogen phosphates which lead to the most useful fire retardant properties. The preferred ratio is 2–4 moles of alcohol or alcohols to each mole of phosphorus pentoxide as this gives a mixture of the mono and dihydrogen phosphates which has the best fire retardant properties.

The composition may be polymerized by either of the known methods of bulk or solution polymerization. Both polymerization processes are well known. In bulk polymerization the monomer is polymerized in the absence of any solvent or dispersing medium; in solution the monomer is polymerized while dissolved in an organic solvent. The value of our invention in a solution polymerization process is that the product is a solution which can be used to deposit films of polymer of low inflammability. Such methods involve the use of catalyst systems that are activated by heat or light. For example, by including from 0.01 to 1% by weight of αα azo diisobutyronitrile in the composition, polymerization can be effected by heating within the range of 40 to 90° C. for from 30 minutes to 8 hours; the polymerization time will depend, of course, upon the catalyst concentration and the temperature used. Examples of other heat activated catalysts include lauroyl peroxide, benzoyl peroxide and other organic azo compounds in which the valencies of the azo group are attached to different non-aromatic, preferably tertiary, carbon atoms.

It is also possible to effect polymerization by means of light by including in the composition a catalyst that is activated by light rays. Examples of such a catalyst include benzoin, acetoin, butyroin, and diacetyl in concentrations of from 0.01 to 1% by weight of the catalyst in the composition.

The preferred method of making up the composition is to add to the methyl methacrylate syrup the phosphorus pentoxide then to add the alcohol or mixture of alcohols and then to allow the phosphorus pentoxide to react with the alcohol or alcohols, preferably by heating at 50 to 70° C. Since phosphorus pentoxide is insoluble in methyl methacrylate it is preferred that initiation of the main polymerization reaction should be delayed until the solution has become substantially clear indicating the virtual completion of the reaction between the phosphorus pentoxide and the alcohol or alcohols. It will be appreciated that some polymerization may take place during the reaction of the phosphorus pentoxide with the alcohol or alcohols but provided this polymerization proceeds only to a small extent and the solution does not become too viscous then the reaction between the phosphorus pentoxide and the alcohol or alcohols can proceed without hindrance and the mixture can be easily transferred to a mould when the polymerization is to be carried out in bulk. The time taken to carry out this stage of the process will depend upon the temperature and the concentrations of the various reactants. The mixture is then polymerized after adding a suitable catalyst.

It will be appreciated that the bulk polymerization of methyl methacrylate is carried out in a mould. Consequently when this is done, the preliminary additions to and treatments of the monomer are made in a separate vessel, and the thus treated monomer is then poured into the mould where polymerization is completed.

Other compounds may be added at any convenient stage in the process. Such compounds include dyestuffs, U.V. absorbers, heat stabilizers, plasticizers (in particular those with known fire retardant properties) and compounds to give the resultant composition a specific property e.g. polystyrene may be added to give an opalescent effect.

This invention is particularly useful when making sheet polymethyl methacrylate when fire retardant properties are desirable. Solid polymers made by bulk polymerization by our process may be useful themselves but more generally they are used as part of some article e.g. as a cover in a lighting fitting.

The invention is illustrated but in no way limited by the following examples in which all parts and percentages are expressed by weight.

*Example I*

218 parts of phosphorus pentoxide and 402 parts of ethylene chlorohydrin were added consecutively to 4540 parts of partially polymerized methyl methacrylate syrup. The mixture was stirred and heated to 60° C. After 30 minutes a clear solution was obtained which was cooled to room temperature. 2.06 parts of azo-diisobutyronitrile were added, the mixture evacuated to remove dissolved air and polymerized in a cell formed by glass plates separated by a resilient gasket at 57° C. for 8 hours and 110° C. for ½ hour to give sheets of colourless transparent polymer ⅛ inch thick. The polymer was found to be non-burning according to A.S.T.M.—D.635–56T whereas the homopolymer of methyl methacrylate without the phosphorus pentoxide and ethylene chlorohydrin gave an inflammable sheet.

*Example II*

28.8 parts of phosphorus pentoxide and 53.1 parts of ethylene chlorohydrin were added in that order to 600 parts of monomeric methyl methacrylate stirred in a flask. The mixture was warmed to 60° C. giving a clear solution after 30 minutes. The solution was cooled and 0.27 part azo-diisobutyronitrile dissolved in it. It was then poured into the cell and polymerized as in Example I. The polymer was found to be non-burning according to A.S.T.M.—D.635–56T.

*Example III*

20.8 parts of phosphorus pentoxide and 47.5 parts of benzyl alcohol were added consecutively to 500 parts of partially polymerized methyl methacrylate stirred in a flask. The mixture was warmed to 60° C. giving a clear solution after 30 minutes. The mixture was cooled, 0.23 part of azo-diisobutyronitrile added and polymerized as in Example I. The polymer was non-burning according to A.S.T.M.—D.635–56T.

*Example IV*

30.1 parts of phosphorus pentoxide and 38.1 parts of n-propyl alcohol were added consecutively to 500 parts of partially polymerized methyl methacrylate stirred in a flask. The mixture was warmed to 60° C. giving a clear solution after 30 minutes. The mixture was cooled, 0.23 part of azo-diisobutyronitrile added and polymerized as in Example I. The polymer was non-burning according to A.S.T.M.—D.635–56T.

*Example V*

Example IV was repeated using isopropyl alcohol in place of n-propyl alcohol.

The resultant polymer was self-extinguishing according to A.S.T.M.—D.635–56T but although self extinguishing, this composition shows that secondary alcohols are not so effective as primary alcohols.

*Example VI*

15.3 parts of phosphorus pentoxide and 26.0 parts of ethylene chlorohydrin were added consecutively to 200 parts of monomeric methyl methacrylate stirred in a flask. The mixture was stirred at room temperature. After 2 hours a clear solution was obtained. 0.1 part of azo-diisobutyronitrile was added and the solution polymerized as in Example I. The polymer was non-burning according to A.S.T.M.—D.635–56T.

*Example VII*

30.3 parts of phosphorus pentoxide and 56.0 parts of ethylene chlorohydrin were added consecutively to a stirred mixture of 10 parts of methacrylic acid and 490 parts of partially polymerized methyl methacrylate. The mixture was warmed to 60° C. and a clear solution was obtained in 30 minutes. The mixture was cooled, 0.23 part of azo-diisobutyronitrile added and the solution polymerized as in Example I. The polymer was non-burning according to A.S.T.M.—D.635–56T.

*Example VIII*

20.9 parts of phosphorus pentoxide and 47.4 parts of ethylene chlorohydrin were added consecutively to 500 parts of partially polymerized methyl methacrylate stirred in a flask. The mixture was stirred at room temperature till a clear solution was obtained. 0.23 part of azo-diisobutyronitrile were added and the solution polymerized as in Example I. The polymer was non-burning according to A.S.T.M.—D.635–56T.

*Example IX*

37.6 parts of phosphorus pentoxide and 30.7 parts of allyl alcohol were added consecutively to 500 parts of partially polymerized methyl methacrylate stirred in a flask. The mixture was warmed to 60° C., giving a clear solution after 30 minutes. 0.18 part of azo-diisobutyronitrile and 0.57 part of cyclohexanone peroxide were added, the solution evacuated to remove dissolved air and the solution polymerized in a glass cell for 2 hours at 68° C., 6 hours at 60° C. and 6 hours at 115° C. to give a sheet ⅛ inch thick. The polymer was non-burning according to A.S.T.M.—D.635–56T.

Example X 30.3 parts of phosphorus pentoxide and a mixture of 25.6 parts of n-propyl alcohol and 12.4 parts of allyl alcohol were added consecutively to 500 parts of partially polymerized methyl methacrylate stirred in a flask. The mixture was warmed to 60° C. and a clear solution obtained in 30 minutes. 0.23 part azo-diisobutyronitrile was added and the solution polymerized as in Example I. The polymer was non-burning according to A.S.T.M.—D.635–56T.

Example XI 14.7 parts of polymethyl methacrylate and 9.66 parts of polystyrene were dissolved in 476 parts of monomeric methyl methacrylate. 24 parts of phosphorus pentoxide and 44.25 parts of ethylene chlorohydrin were added consecutively to the stirred solution which was then warmed to 50–55° C. A clear solution was obtained after 30 minutes. The solution was cooled and 0.23 part of azo-diisobutyronitrile added. Polymerization was carried out as described in Example I. A white opal sheet having a 58% light transmission for ⅛ inch thickness was obtained which was non-burning according to A.S.T.M.—D.635–56T.

Example XII 0.0025 part hydroquinone and 500 parts methyl methacrylate were stored at 55–60° C. and 193 parts phosphorus pentoxide and 307 parts ethylene chlorohydrin added over a period of 30 minutes. After stirring for a further hour at 55–60° C. a practically clear solution was obtained which was cooled and filtered. A further 0.0025 part hydroquinone was added to inhibit polymerization of the methyl methacrylate.

30 parts of this solution were mixed with 70 parts of partially polymerized methyl methacrylate syrup and 0.032 part azo-diisobutyronitrile and polymerized as in Example I. The polymer was non-burning according to A.S.T.M.—D.635–56T.

Example XIII 1.32 parts phosphorus pentoxide and 1.68 parts n-propyl alcohol were added with stirring to 82 parts of partially polymerized methyl methacrylate syrup. The mixture was heated to 60° C. with stirring and after 20 minutes a clear solution was obtained. The solution was cooled to 20–25° C. and 15 parts tris 2:3 dibromopropyl phosphate added. 0.032 part azo-bis-diisobutyronitrile was added and the solution polymerized as in Example I. The polymer was self-extinguishing according to A.S.T.M.—D.635–56T.

I claim:

1. A polymerization process which comprises polymerizing a monomeric composition in bulk or in solution, said monomer composition, which may be partially polymerized, comprising methyl methacrylate or mixtures of methyl methacrylate with up to 15% by weight, based on the total weight of said monomeric composition, of a second copolymerizable monomer selected from the group consisting of acrylic acid, methacrylic acid acrylate acid esters, methacrylic acid esters, styrene, halogen substituted styrene, and acrylonitrile, to which has been added phosphorus pentoxide and at least one alcohol selected from the class consisting of aliphatic alcohols, cycloaliphatic alcohols and aralkyl alcohols containing from 1 to 8 carbon atoms per molecule, there being from 1.5 to 5 moles of alcohol or mixture of alcohols to each mole of phosphorus pentoxide, and initiating polymerization of the polymerizable ingredients during or after reaction of the phosphorus pentoxide and said alcohol, the amount of said phosphorus pentoxide and said alcohol initially added forming from 3 to 20% by weight of the total weight of polymerizable ingredients in the material undergoing polymerization together with any polymer present plus the weight of said initially added phosphorus pentoxide and said alcohol.

2. A polymerization process according to claim 1 in which methyl methacrylate is polymerized as a mixture with at least one lower alkyl acrylate containing from 1 to 12 carbon atoms in the alkyl part of the molecule.

3. A polymerization process according to claim 1 in which said alcohol is selected from the group consisting of chloroethyl alcohol, isopropyl alcohol, n-propyl alcohol, butyl alcohol, benzyl alcohol, cyclohexyl alcohol, allyl alcohol and mixtures thereof.

4. A polymerization process according to claim 1 in which the amount of said phosphorus pentoxide and said alcohol or alcohols initially added forms from 9 to 18% by weight of the total weight of phosphorus pentoxide and alcohol or alcohols initially added plus the weight of monomer and any polymer present in the polymerization mixture.

5. A polymerization process according to claim 1 in which in the initially added mixture of phosphorus pentoxide and alcohol or alcohols there are from 2 to 4 moles of alcohol or alcohols to each mole of phosphorus pentoxide.

6. A bulk polymerization process according to claim 1 carried out in the presence of a polymerization catalyst at a temperature of from 40 to 90° C.

7. A polymerization process according to claim 1 in which said methyl methacrylate alone or as a mixture with other copolymerizable monomers is first heated to 50 to 70° C. together with said initially added phosphorus pentoxide and alcohol or alcohols and a polymerization catalyst is thereafter added when the mixture has become substantially clear.

8. A polymerization process according to claim 7 in which after the addition of said catalyst the mixture is poured into a mould and polymerization is thereafter carried out in said mould.

References Cited by the Examiner
UNITED STATES PATENTS

| | | | |
|---|---|---|---|
| 2,272,668 | 2/1942 | Honel | 260—30.6 |
| 2,701,258 | 2/1955 | Brown et al. | 260—30.6 |
| 2,773,046 | 12/1956 | Dunn et al. | 260—30.6 |
| 2,868,760 | 1/1959 | Staicopoulos | 260—30.6 |

MORRIS LIEBMAN, *Primary Examiner.*

L. T. JACOBS, *Assistant Examiner.*